United States Patent
Ikeda et al.

(10) Patent No.: US 6,419,498 B1
(45) Date of Patent: Jul. 16, 2002

(54) MAGNETIC MATERIAL-INVERTING DISPLAY PANEL

(75) Inventors: Masahiko Ikeda; Hideki Misawa; Takeo Yokoyama, all of Kanagawa (JP)

(73) Assignee: Kabushiki Kaisha Pilot, Tokyo (JP)

( * ) Notice: Subject to any disclaimer, the term of this patent is extended or adjusted under 35 U.S.C. 154(b) by 0 days.

(21) Appl. No.: 09/722,623

(22) Filed: Nov. 28, 2000

(30) Foreign Application Priority Data

Jan. 26, 2000 (JP) .......................................... 2000-54750

(51) Int. Cl.⁷ .................................................. B43L 1/00
(52) U.S. Cl. ........................ 434/409; 434/408; 434/422; 252/62.51 R
(58) Field of Search ................................. 434/168, 190, 434/301, 330, 409, 410; 252/62.51 R, 62.51 C, 62.52–62.64

(56) References Cited

U.S. PATENT DOCUMENTS

| 4,143,472 A | * | 3/1979 | Murata |
| 4,368,952 A | * | 1/1983 | Murata |
| 5,295,837 A | * | 3/1994 | Gilano |
| 5,411,398 A | * | 5/1995 | Nakanishi |
| 5,429,503 A | * | 7/1995 | Murata |
| 5,846,630 A | * | 12/1998 | Tazaki |
| 6,007,734 A | * | 12/1999 | Tazaki |
| 6,196,848 B1 | * | 3/2001 | Yamazaki |

FOREIGN PATENT DOCUMENTS

JP 59-32796 8/1984

* cited by examiner

*Primary Examiner*—Derris H. Banks
*Assistant Examiner*—Dmitry Suhol
(74) *Attorney, Agent, or Firm*—Rader, Fishman & Grauer, PLLC

(57) ABSTRACT

A magnetic material-inverting display panel which provides a clear display and the erasure by having a liquid dispersion, which has a predetermined yield value and contains a magnetic display material in fine particle form having magnetic poles of opposite signs tinged with different colors. The liquid dispersion also includes a dispersion medium and a thickener as main components, and is supported by a supporting member. The total area of S-pole-surfaces or N-pole-surfaces of fine particles of the magnetic display material being from 60 to 500% of the display surface area of the display panel.

12 Claims, No Drawings

MAGNETIC MATERIAL-INVERTING DISPLAY PANEL

TECHNICAL FIELD OF THE INVENTION

The present invention relates to a magnetic material-inverting display panel which forms a display by inverting a magnetic display material with a magnet and erasing the display by inverting the material with a magnet from the same side.

BACKGROUND OF THE INVENTION

Magnetic display panels of earlier technology contained fine particles of a magnetic material in a dispersion that could be migrated in a display panel to its surface according to an operation of a magnet. The display could be erased through precipitation of the magnetic particles by operating a magnet from the opposite surface of the display panel. This type of the magnetic display panel has a drawback that the apparatus becomes complex and large since erasure of a display should be carried out from the backside of the panel. In addition, when such magnetic particles migrate to the display panel, it is difficult to erase only an unnecessary part of the display.

Furthermore, Japanese Patent Publication No. 59-32796/1984 proposed a magnetic display panel that realized a display by means of inverting display magnetic particles. The panel used a dispersion of magnetic particles having a residual magnetic moment of 0.2 to 10 emu/g and a coercive force of no less than 500 oersteds, and having a yield value of no less than 5.0 N/m². However, the panel has the problems of low contrast and unclearness when a display is formed by inverting magnetic particles, or the display is erased.

SUMMARY OF THE INVENTION

The present invention relates to a magnetic material-inverting display panel wherein cleanliness of display and cleanliness of erasure are achieved. Particularly, the present invention relates to a magnetic material-inverting display panel including a liquid dispersion, which has a predetermined yield value and contains a magnetic display material in fine particle form having magnetic poles of opposite signs tinged with different colors, a dispersion medium and a thickener as main components. The liquid dispersion may be supported by a supporting member. The total area of S-pole-surfaces or N-pole-surfaces of fine particles of the magnetic display material may be from 60 to 500%, or preferably, from 75 to 250%, of the display surface area of the display panel.

The thickener may be one or more selected from fatty acid bisamides having a hydroxide group, hydrogenated castor oil, and alkylamides of N-acylamino acids. The magnetic display material in fine particle tinged with different colors may be obtained by dispersing magnetic particles into a synthetic resin and/or synthetic rubber composition having a specific color to form a layer and cutting or pulverizing the layer one surface of which is coated or laminated with a tinged composition having a different color. The liquid dispersion, in which the magnetic display material is disposed may have a yield value of 0.15 to 7.5 N/m², preferably, 0.92 to 7.5 N/m², and a viscosity of 3 to 350 mPa·s, preferably, 8 to 350 mPa·s.

PREFERRED EMBODIMENTS OF THE INVENTION

The magnetic display material to be used in the present invention is a magnetic material wherein two magnetic poles of N and S are tinged with different colors, the magnetic material being inverted by the action of magnetism to form a display. For example, when the display surface of the panel is swept with S-pole of a writing magnet, the N-pole surfaces of the magnetic display material are arranged at the panel surface to make it an N-pole color. Upon writing the surface with an N-pole of the magnetic pen, the magnetic display material is inverted and the S-pole surface appears to form a display of the color. When the panel is again swept with S-pole of the magnetic pen, the material is inverted and the display disappears.

In the present invention, the total surface area of the S-poles or N-poles of the magnetic display material should be from 60 to 500%, preferably 75 to 250% of the display surface area of the display panel.

The display surface area of the display panel is an area of a flat surface for displaying the effects of the display panel containing a liquid dispersion in which the magnetic display material is dispersed.

The present inventors have discovered that an unclear display of the conventional magnetic material-inverting display panel is attributed to improperness of the surface area of S-poles or N-poles of the magnetic material particles for displaying relative to the display surface area of the panel.

When the surface area of S-poles or N-poles of the magnetic material for displaying is smaller than 60% of the display surface area of the panel, the displayed color tends to be pale and the displayed color and that of the background supporting member tended to be close, so that the contrast tends to be low and the resulting display becomes unclear. On the other hand, when the surface area of the magnetic material exceeds 500% of the display surface area, owing to mutual interferences among magnetic material, the inversion of the material tended to become more difficult, resulting in the occurrence of the uninverted material, the material showing a boundary surface between the S-pole and the N-pole, and the like, so that the resulting display tends to have a mixed color thereof and a clear display tends to be difficult to be formed.

The liquid dispersion in which the magnetic display material is dispersed should have a specific yield value and viscosity. The yield value is necessary for properly dispersing the magnetic display material in the liquid dispersion and preventing its precipitation or falling in the liquid dispersion. The viscosity is required for inverting only the part exposed to magnetism when the display panel is exposed to magnetism. Namely, it is preferred that the liquid dispersion has a yield value of 0.15 to 7.5 N/m² and a viscosity of 3 to 350 mPa·s. As a thickener for imparting a yield value, an inorganic substance such as AEROSIL can be used, but inorganic thickeners have drawbacks that the viscosity and the yield value change with a lapse of time. In contrast, an organic thickener selected from fatty acid bisamides, hydrogenated castor oil, and amides of N-acylamino acids is preferable owing to advantages that such imparts a yield value, and the viscosity and the yield value hardly change with a lapse of time.

In the case that the liquid dispersion has a yield value and a viscosity of out of the ranges of 0.15 to 7.5 N/m² and 3 to 350 mPa·s respectively, stability in maintenance of the formed display tends to be deteriorated and, owing to assembly of the surrounding magnetic material upon writing with a magnetic pen, the distribution of the magnetic material becomes inhomogeneous, so that the color of the periphery of a display formed through inversion and the color of the background of the display formed by the uninverted magnetic material at the surrounding part (of the display) change. As a result, the display tends to be unclear as a whole and thus, the clearness tends to be deteriorated.

The magnetic display material to be used in the present invention is not limited to a particular form so long as the S-pole surfaces and N-pole surfaces are tinged with different colors. However, in view of the display-formability at writing with a magnetic pen and clearness of the display formed, it is preferred that the magnetic display material in a fine particle form tinged with different colors is obtainable by the steps of dispersing magnetic particles into a synthetic resin and/or synthetic rubber composition having a specific first color to form a layer, and cutting or pulverizing the layer one surface of which is coated with a tinged composition having a different color than the first color. Alternatively, in another preferred embodiment the magnetic display material in a fine particle form and tinged with different color is obtainable by the steps of dispersing magnetic particles into a synthetic resin and/or synthetic rubber composition having a specific first color to form a layer, and cutting or pulverizing the layer one surface of which is laminated with a tinged sheet having a different color than the first color. According to the research by the present inventors, the magnetic display material is inverted by the action of magnetic force of the opposite pole, and the magnetic material in a flat or foil form are inverted in a stacked state with the stacks sliding relative to each other. Accordingly, such a material is preferable because not only is the speed of formation of a display high, but also a clear display is formed with little coexistence of the uninverted or insufficiently inverted material.

In particular, in the case of flat or foil-shaped magnetic display material, when the total surface area of S-poles or N-poles of the magnetic display material is not less than 500% of display area of the panel, the inversion of the stacked material with the stacks sliding relative to each other becomes insufficient owing to their mutual interferences.

The magnetic display material tends to be charged with static electricity owing to friction between the material when inverted. Especially, the flat or foil-shaped magnetic display material is easy to be charged since it is inverted in a stacked state with the stacks sliding relative to each other. When the magnetic display material is charged, the magnetic display material aggregates, so that its smooth inversion becomes difficult or it is not partially inverted. As a result, there occurs a case that a clear display by the magnetic display material having different colors cannot be attained, and therefore, the above charging is not preferred. A preferable display can be attained by mixing an antistatic agent with the liquid dispersion of the magnetic display material.

As the antistatic agent, one or more selected from sulfation products of polybutene, aliphatic alkyl quaternary ammonium salts, aminoethanol-epichlorohydrin polycondensates, alkylbenzenesulfonic acids, metallic salts of alkylsalicylic acids, sulfosuccinic acid salts, dialkylsulfosuccinic acid salts, and metallic salts of dodecylbenzenesulfonic acid may be used. In particular, preferred are sulfation products of polybutene, aliphatic alkyl quaternary ammonium salts, aminoethanol-epichlorohydrin polycondensates, a mixture of alkylbenzenesulfonic acids, chromium salts of alkylsalicylic acids, calcium salt of sulfosuccinic acid and polymer mixtures.

The supporting member that supports a liquid dispersion of magnetic display material is not particularly limited and the following may be optionally used: a support composed of two substrates placed with a space between them and sealed at their periphery; a support wherein regular hexagonal honeycomb cells are placed between above two substrates; a support wherein capsules are placed at the substrate; and the like.

EXAMPLES

Examples of the present invention are described below. However, the present invention is not limited to the examples.

Example 1

On a PET film having a thickness of 25 $\mu$m, a green-colored magnetic ink composed of a composition of the formulation (A) shown in Table 1 was prepared, coated, and dried according to the following procedures to obtain a green magnetic sheet. At this time, a thickness of the magnetic ink layer was 10 $\mu$m and the coating weight was 14.0 g/m$^2$.

(Procedure 1) A resin was dissolved in MEK in a ratio described in the formulation (A), and magnetic powder was added thereto and dispersed in an attritor.

(Procedure 2) To the dispersion, a blue ink, a yellow ink, and a white ink manufactured by Mikuni Color Ltd. were added in a ratio of the formulation (A). Thereafter, the whole was mixed with stirring to obtain a magnetic ink showing a green color.

(Procedure 3) The magnetic ink was coated by means of a die coater at a rate of 30 m/minute and dried to obtain the aforementioned green magnetic sheet.

Then, a white ink of the formulation (B) shown in Table 2 was coated on the green magnetic layer of the sheet and dried to effect a lamination on the green magnetic layer.

Thickness of the white ink layer was 18 $\mu$m and the coating weight was 35.3 g/m$^2$. As described above, together with the green magnetic ink layer previously coated, a two-colored sheet having a thickness of 28 $\mu$m and a coating weight of 49.3 g/m$^2$ was formed on the base film.

Subsequently, the two-colored layer was magnetized together with the base film to make the green-colored side N-pole and the white-colored side S-pole, and then the two-colored sheet was detached from the base film to result in a thin film. The thin film was further pulverized in a mortar and then sieved to obtain a magnetic display material which had a particle size of the range of 63 to 212 $\mu$m and were tinged with two colors of green/white.

TABLE 1

| Formulation (A) | | |
|---|---|---|
| Blue ink | 5.6 parts by weight | MHI Blue #454: Manufactured by Mikuni Color Ltd. |
| Yellow ink | 22.3 parts by weight | MHI Yellow #593: Manufactured by Mikuni Color Ltd. |
| White ink | 10.0 parts by weight | MHI White #2179: Manufactured by Mikuni Color Ltd. |
| Magnetic powder | 19.0 parts by weight | GP-300: Manufactured by Toda Kogyo Corporation |
| Resin | 22.8 parts by weight | EPICOAT #1007: Manufactured by Yuka Shell Epoxy Kabushiki Kaisha |
| Solvent | 20.3 parts by weight | MEK |

TABLE 2

| Formulation (B) | | |
|---|---|---|
| White ink | 66.6 parts by weight | MHI White #2179: Manufactured by Mikuni Color Ltd. |
| Resin | 15.0 parts by weight | EPICOAT #1007: Manufactured by Yuka Shell Epoxy Kabushiki Kaisha |
| Solvent | 18.4 parts by weight | MEK |

Next, 407.92 parts by weight of isoparaffin having a viscosity at 25° C. of 2.0 mPa·s (manufactured by Esso Chemical Co., Ltd.: commercial name ISOPAR-M) as a dispersion medium and ethylenebis-12-hydroxystearic acid amid (ITOH WAXJ-530, manufactured by Itoh Oil Chemicals Co., Ltd.) as a thickner were mixed in a ratio of 70 parts by weight to 30 parts by weight. After the above was heated and dissolved, a dispersion was obtained upon cooling. Then, the dispersion was diluted with isoparaffin so that the ratio of isoparaffin to the thickner became 407.92 parts by weight to 12.42 parts by weight. An antistatic agent (STADIS-450, manufactured by E. I. Dupont Co., Ltd.) was added thereto so as to amount to 0.15% of the total to obtain a plastic dispersion having a yield value of 1.76 N/m$^2$ and a viscosity at 25° C. of 16 mPa·s.

The yield value was determined according to a method of reading a torsional angle of rotor when the dispersion was rotated at a low speed using Brookfield viscometer (BL-type manufactured by Tokyo Keiki Co., Ltd.) similarly to the conventional method. A No.2 rotor attached to the above BL-type viscometer was used as the rotor.

Moreover, regarding the measurement of the viscosity, the value under the conditions of shear stress of 10 Pa was measured using a stress-controlling rheometer (CSL-100 manufactured by Carri-Med Ltd.).

Successively, the magnetic display material tinged with two colors of green/white was mixed with the plastic dispersion in a ratio of 20 parts by weight of the magnetic display material per 100 parts by weight of the dispersion and the whole was stirred to obtain a liquid dispersion wherein the magnetic display material was homogeneously dispersed in the dispersion. Specific gravity of the liquid dispersion was determined to be 0.87.

Then, the liquid dispersion was charged into cells of multi-cell structure of a honeycomb made of vinyl chloride resin, the honeycomb being regular hexagonal, having a cell size of 3 mm and a height of 0.8 mm, and being adhered to a vinyl chloride resin film having a film thickness of 0.15 mm at the one side by an adhesive. Thereafter, the open surface of the multi-cell structure was covered with a vinyl chloride resin film having a thickness of 0.08 mm by an adhesive, so that the liquid dispersion was encapsulated into the cells to obtain a display panel. At that time, a ratio of the total area of one color of the magnetic display material contained in the display panel relative to the display surface of the panel was 236% according to the following calculation.

(1) The display surface area of honeycomb cells having a cell size of a mm is $S_{honeycomb}=(\sqrt{3}/2) \times a^2$. Therefore, in the case of honeycomb cells having a cell size of 3 mm, $S_{honeycomb}=3 \times 3 \times \sqrt{3} \div 2 = 7.794$ mm$^2$.

(2) On the other hand, the sum of layer area of one-color side of the magnetic display material is represented as follows: $S_{particles}$=(volume of cells)×(specific gravity of contained liquid)×(concentration of particles)÷(specific gravity of particles)÷(thickness of particles).

Therefore, $S_{particles}=7.794 \times 0.8 \times 0.87 \times (20 \div 120) \div (49.3 \div 28) \div 0.028 = 18.37$ (mm$^2$).

(3) Accordingly, a ratio of the layer area of one surface of the magnetic display material to area of honeycomb is as follows: $18.37 \div 7.794 \times 100 = 236(\%)$.

By contacting S-pole of a magnet to one side of the panel, a green-colored display surface was formed through pulling the magnetic display material near to the front side and placing it so as to arrange the particles with partial stacking. Then, when a writing operation was carried out with N-pole of a magnet on the surface of the vinyl chloride resin film, a white clear display could be obtained only on the part of the green-colored display surface where the N-pole of the magnet passed. Color difference between the green surface and the white surface was measured and the difference of L values in $L_{ab}$ system, i.e., $\Delta L$ was found to be 31.56 (A spectrocolorimeter CM-512m$^2$ manufactured by Minolta Co., Ltd. was used as a color-difference meter).

Next, when rubbing operation with S-pole of the magnet was again carried out on the white display part, the magnetic display material whose white surface faced the surface of the panel was inverted and it was possible to return the part again to a green-colored display surface.

Example 2

Similarly to Example 1, to 417.0 parts by weight of isoparaffin (manufactured by Esso Chemical Co., Ltd.: commercial name ISOPAR-M) was added 9.66 parts by weight of ethylene bis-12-hydroxystearic acid as a thickner. Cooling after melting the whole under heating afforded a dispersion having a yield value of 0.92 N/m$^2$ and a viscosity at 25° C. of 8 mPa·s.

Then, 5 parts by weight of the magnetic display material was prepared according to a method similar to that in Example 1 was mixed into 100 parts by weight of the dispersion and the whole was stirred to obtain a liquid dispersion. Specific gravity of the liquid dispersion was determined to be 0.81.

Next, the liquid dispersion was charged into cells of multi-cell structure of a honeycomb made of a polyester film, the honeycomb being regular hexagonal, having a cell size of 3 mm and a height of 0.8 mm, and being adhered to a polyester film having a film thickness of 0.125 mm at the one side by an adhesive. Thereafter, the open surface of the multi-cell structure was covered with a polyester film having a thickness of 0.05 mm by an adhesive, so that the liquid dispersion was encapsulated into the cells to obtain a display panel. At that time, the display area of the honeycomb cells of the display panel was 7.794 mm$^2$, while the sum of the display area of one color of the magnetic display material was 4.917 mm$^2$. Accordingly, a ratio of the display area of the one-colored surface of the magnetic display material to display area of the panel was 63%.

The display panel was placed on a white board and N-pole of a magnet was contacted to the surface of the panel to form a white-colored display surface through pulling the magnetic display material near to the surface of the panel and also arranging the magnetic display material so that the white surfaces of the material particles faced the front side.

Then, when a writing operation was carried out with S-pole of a magnet on the surface of the polyester film of the display surface, the magnetic display material corresponding to the part where the magnet passed was inverted and a green-colored display could be observed with the eye. At that time, a color difference between the white surface and the green surface at the display surface was determined and L values in $L_{ab}$ system were compared. As a result, there was found a difference of 11.8 in ΔL, which supported the result of the observation with the eye.

Example 3

To isoparaffin having a viscosity at 25° C. of 7.48 mPa·s (manufactured by Esso Chemical Co., Ltd.: commercial name NAS5H) was added the above thickner in a ratio of 30 parts by weight per 70 parts by weight of the former. After the above was heated and dissolved, a dispersion was obtained upon cooling. Then, the dispersion was diluted so that the ratio of isoparaffin to the thickner became 428 parts by weight to 21 parts by weight. An antistatic agent was added thereto so as to amount to 0.15% of the total, so that a dispersion having a yield value of 7.5 N/m² and a viscosity at 25° C. of 333 mPa·s was obtained. Forty (40) parts by weight of the magnetic display material were mixed into 100 parts by weight of the dispersion to obtain a liquid dispersion. Similarly to Example 2, the liquid dispersion was charged into cells of multi-cell structure of a honeycomb made of a polyester film, the honeycomb being regular hexagonal, having a cell size of 3 mm and a height of 0.8 mm, and being adhered to one surface of a polyester film having a film thickness of 0.125 mm at the one side by an adhesive. Thereafter, the open surface of the multi-cell structure was covered with a polyester film having a thickness of 0.1 mm by an adhesive, so that the liquid dispersion was encapsulated into the cells to obtain a display panel. At that time, specific gravity of a liquid dispersion contained in the cells was 0.99 and the sum of display area of one color of the magnetic display material was 35.83 mm² according to the aforementioned equation. Accordingly, a ratio of the total display area of the one-colored surface of the magnetic display material to display area of the panel was 457%.

By contacting the S-pole of a magnet to one side of the display surface of the panel, a green-colored display surface was formed through arranging the magnetic display material with partial stacking so that the green-colored surfaces of the material particles came into contact with the surface of the display panel.

Then, when writing was carried out with the N-pole of a magnet on the display surface, a clear white record could be preformed at the part where writing was carried out as in Example 1. Also, after the magnetic display material in the honeycomb cells is inverted by contacting the whole surface of the panel with the N-pole of the magnet so that the white surfaces of the material particles were placed on the front side, writing with the S-pole of the writing magnet affected inversion of the magnetic display material in the honeycomb cells corresponding to the part where the S-pole of the magnet passed to result in an appearance of a green surface at the front side and a clear green display on a white background could be realized. At that time, L values of the green surface and the white surface on the display surface were measured and ΔL was determined to be 31.0.

Example 4

A liquid dispersion was prepared in a similar manner to Example 3 with the exception that the mixing ratio of the dispersion to the magnetic display material was changed to 100:5. Specific gravity of the liquid dispersion was determined to be 0.86.

Similar to Example 2, the liquid dispersion was charged into cells of multi-cell structure of a honeycomb made of a polyester film, the honeycomb being regular hexagonal, having a cell size of 3 mm and a height of 0.8 mm, and being adhered to one surface of a polyester film having a film thickness of 0.125 mm at the one side by an adhesive. Thereafter, the open surface of the multi-cell structure was covered with a polyester film having a thickness of 0.1 mm by an adhesive, so that the liquid dispersion was encapsulated into the cells to obtain a display panel. In the panel, the sum of the display area of one color of the magnetic display material was 5.22 mm2 according to the aforementioned equation. Accordingly, a ratio of the total display area of the one-colored surface of the magnetic display material relative to display area of the panel was 66%.

By contacting the S-pole of a magnet to one side of the display surface of the display panel, a green-colored display surface was formed through arranging the magnetic display material with partial stacking so that the green-colored surfaces of the material came into contact with the inner surface of the surface film of the display panel.

Then, when writing was carried out with the N-pole of a magnet on the display surface, a clear white record could be preformed at the part where writing was carried out as in Example 1. Also, after the magnetic display material in the honeycomb cells was inverted by contacting the whole surface of the panel with N-pole of the magnet so that their white surfaces were placed at the front side, writing with the S-pole of the magnet effected inversion of the magnetic display material in the honeycomb cells corresponding to the part where the S-pole of the magnet passed to result in an appearance of a green surface at the front side and a clear green display on a white background could be realized. At that time, L values of the green surface and the white surface on the display surface were measured and ΔL was determined to be 13.8.

Example 5

A liquid dispersion was prepared in a similar manner to Example 2 with the exception that the mixing ratio was changed to 40 parts by weight of the magnetic display material per 100 parts by weight of the dispersion. Specific gravity of the liquid dispersion was 0.94.

The liquid dispersion was sealed in honeycomb cells made of vinyl chloride resin having a cell size of 3 mm and a height of 0.8 mm to obtain a panel wherein a ratio of the total area of the one-colored surface of the magnetic display material to area of the honeycomb was 435%.

By contacting the S-pole of a magnet to one side of the display surface of the display panel, a green-colored display surface was formed through arranging the magnetic display material with partial stacking so that the green-colored surfaces of the material particles in the honeycomb cells came into contact with the inner surface of the front side film of the display panel.

Then, when writing was carried out with the N-pole of the magnet on the display surface, a clear white record could be preformed at the part where writing was carried out as in Example 1. Also, after the magnetic display material in the honeycomb cells was inverted by contacting the whole surface of the panel with the N-pole of the magnet so that their white surfaces were placed at the front side, writing with the S-pole of the magnet effected inversion of the magnetic display material in the honeycomb cells corresponding to the part where the S-pole of the magnet passed to result in an appearance of a green surface at the front side and a clear green display on a white background could be realized. At that time, L values of the green surface and the white surface on the display surface were measured and ΔL was determined to be 41.3.

Example 6

A liquid dispersion was prepared in a similar manner to Example 1 with the exception that a ratio of the magnetic display material in the liquid dispersion was changed to 15 parts by weight of the magnetic display material per 100 parts by weight of the dispersion. Specific gravity of the liquid dispersion was determined to be 0.82.

The liquid dispersion was sealed in honeycomb cells made of vinyl chloride resin having a cell size of 3 mm and a height of 0.8 mm to obtain a panel wherein a ratio of the total area of the one-colored surface of the magnetic display material to area of the honeycomb was 75%.

By contacting the S-pole of a magnet to one side of the display panel, a green-colored display surface was formed through pulling the magnetic display material near to the back surface side and placing it so as to arrange the particles with partial stacking.

Then, when a writing operation was carried out with the N-pole of a magnet on the surface of the vinyl chloride film, a white clear display could be obtained against the green-colored surface at the part where the N-pole of the magnet passed. Color difference between the green surface and the white surface was determined and the difference of L values in $L_{ab}$ system, i.e., $\Delta L$ was found to be 16.8.

Example 7

In Example 1, AEROSIL (AEROSIL 200 manufactured by Nippon Aerosil Co., Ltd.) was used as a thickner instead of ethylene bis-12-hydroxystearamide in an amount of 41.4 parts by weight per 407.92 parts by weight of isoparaffin to obtain a plastic dispersion having a yield value of 1.89 N/m² and a viscosity at 25° C. of 10 mPa·s.

The magnetic display material was mixed into the dispersion in a ratio of 15 parts by weight of the magnetic display material per 100 parts by weight of the dispersion and the whole was stirred to obtain a liquid dispersion having a specific gravity of 0.85.

Similar to Example 1, the liquid dispersion was sealed in honeycomb cells made of vinyl chloride having a cell size of 3 mm and a height of 0.8 mm to obtain a display panel wherein a ratio of the total area of the one-colored surface of the magnetic display material relative to area of the honeycomb was 180%.

Writing and erasing with a magnet using the panel as in Example 1 affected a good display. At that time, L values of the green surface and the white surface on the display surface were measured and $\Delta L$ was determined to be 22.1.

Example 8

First, following the procedures described in Example 1, a green magnetic sheet having a thickness of 10 μm and a coating weight of 14.0 g/m² was prepared using inks of the formulation shown in Table 3.

Then, a white ink of the formulation (B) shown in Table 4 was applied onto a release-treated surface of a polyester film (manufactured by Toyo Metallizing Co., Ltd.: commercial name CERAPEEL) which had a thickness of 38 pm and had been subjected to a treatment for easy release, so that a white-colored sheet having a dry thickness of 8 μm and a coating weight of 35.3 g/m². Furthermore, the ink-applied surface of the white-colored sheet was coated with a polyester resin having a softening point of 110° C. with a thickness of 2 μm.

Thereafter, the surface of the green magnetic sheet and the resin-coated surface of the white-colored sheet were combined, adhered under pressure at 140° C. to be integrated, and the integrated sheet was then magnetized in that state to make the green side N-pole and the white side S-pole.

Subsequently, the base films themselves of the integrated sheet were peeled off the polyester film of 38 μm was detached to obtain a sheet which had a lamination of an order of a green magnetic ink layer, an adhesive layer, and a white-colored layer, and was magnetized the green magnetic ink layer side as N-pole and the white-colored ink layer side as S-pole. Furthermore, a two-colored thin film was detached from the PET film of 25 μm. The thin film was further pulverized in a mortar and then sieved to obtain a magnetic display material which had a particle size of the range of 63 to 212 μm and was tinged with two colors of green/white.

TABLE 3

| Formulation (A) | | |
|---|---|---|
| Blue ink | 5.6 parts by weight | MHI Blue #454: Manufactured by Mikuni Color Ltd. |
| Yellow ink | 22.3 parts by weight | MHI Yellow #593: Manufactured by Mikuni Color Ltd. |
| White ink | 10.0 parts by weight | MHI White #2179: Manufactured by Mikuni Color Ltd. |
| Magnetic powder | 19.0 parts by weight | GP-300: Manufactured by Toda Kogyo Corporation |
| Resin | 22.8 parts by weight | EPICOAT #1007: Manufactured by Yuka Shell Epoxy Kabushiki Kaisha |
| Solvent | 20.3 parts by weight | MEK |

TABLE 4

| Formulation (B) | | |
|---|---|---|
| White ink | 66.6 parts by weight | MHI white #2179: Manufactured by Mikuni Color Ltd. |
| Resin | 15.0 parts by weight | EPICOAT #1007: Manufactured by Yuka Shell Epoxy Kabushiki Kaisha |
| Solvent | 18.4 parts by weight | MEK |

Using the magnetic display material, a panel was prepared according to the method as described in Example 1 and evaluated to obtain good results.

Example 9

A liquid dispersion was prepared according to the method described in Example 1. The liquid dispersion was charged into a sheet of multi-cellular honeycomb form shaped by vacuum forming from a vinyl chloride sheet having a thickness of 0.15 mm. Thereafter, the open surface of the multi-cell structure was covered at the backside with a vinyl chloride sheet having a thickness of 0.08 mm by an adhesive, so that the liquid dispersion was encapsulated to obtain a display panel. Evaluation of the panel afforded good results.

Example 10

Using a liquid dispersion prepared as described in Example 1, spherical capsules having an inner diameter of 2 mm were formed according to an orifice method. At that time, the volume of the capsules was 4.187 mm$^3$ and display area of the capsule of the display panel was 3.14 mm$^2$, while the sum of display area of the one-colored surfaces of the magnetic display material particles was 14.18 mm$^2$. Accordingly, a ratio of the area of the one-colored surfaces of the magnetic display material particles to the display area was 452%.

Using 0.5% aqueous solution of sodium alginate as a membrane material of the capsules, the aqueous solution of the membrane material was squeezed out from outer nozzle of a double nozzle of a concentric circle shape and, at the same time, the dispersion in which the magnetic display material was dispersed was squeezed out from the inner nozzle. Shape and size of the capsules were regulated by controlling the pressure and speed at the squeezing out. The capsules squeezed out from the nozzle were dropped into 1% aqueous calcium chloride solution, and sodium alginate sol in the membrane material was reacted with calcium chloride which is a chemical gelling agent to stabilize the capsules by forming gel membrane.

The capsules were placed in a tray made of vinyl chloride having a depth of 2 mm with no space between the capsules. After a vinyl chloride film was placed on the tray, flange part of the tray and the vinyl chloride film was fused with heating to obtain a display panel.

When writing and erasure were tried from the upper surface of the panel, the writing and erasure could preferably be conducted.

Comparative Example 1

Four (4) parts by weight of the magnetic display material prepared as described in Example 1 were added to 100 parts by weight of the dispersion of Example 2 and the whole was stirred to obtain a liquid dispersion. Specific gravity of the liquid dispersion was determined to be 0.81.

Then, a display panel was prepared from the liquid dispersion according to the method as described in Example 2. Display area of the honeycomb cells of the display panel was 7.794 mm$^2$, while the sum of the display area of one color of the magnetic display material was 3.892 mm$^2$. Accordingly, a ratio of the total display area of the one-colored surface of the magnetic display material to display area of the panel was 50%.

The display panel was placed on a white board as in Example 2 and the N-pole of a magnet was contacted to the surface of the panel to pull the magnetic display material to the display surface side and arrange them so that their white surface sides face the front surface of the panel side. Thereafter, the S-pole of the magnet was contacted to the front surface of the panel for writing, but a green display sufficient to recognize with the eye could not be attained. In addition, ΔL value was 8.0 determined with a color-difference meter according to the same method as that of Example 2.

Comparative Example 2

A display panel was prepared in a similar manner to Example 2 with the exception that the mixing ratio of the magnetic display material in the liquid dispersion was changed to 50 parts by weight of the magnetic display material per 100 parts by weight of the dispersion. At that time, specific gravity of the liquid dispersion was 0.97 and the sum of the display area of one color of the magnetic display material was 40.846 mm$^2$. Accordingly, a ratio of the display area of the one-colored surface of the magnetic display material to display area of the panel was 524%.

Using the display panel, after the color of the display surface was made green, a white record was displayed but an unclear display was observed as a whole though the difference between L values of the green surface and the white surface, i.e., ΔL was 30.7.

Then, the back surface of the panel was checked to confirm that the magnetic display material, like an insert, came into the portion at which the film adhered to the back surface and the honeycomb core were adhered, and the adhesion was in an insufficient state.

Comparative Example 3

A display panel was prepared in a similar manner to Example 3 with the exception that the mixing ratio of the magnetic display material in the liquid dispersion was changed to 50 parts by weight of the magnetic display material per 100 parts by weight of the dispersion. At that time, specific gravity of the liquid dispersion was 1.02 and the sum of the display area of one color of the magnetic display material was 42.951 mm$^2$. Accordingly, a ratio of the display area of the one-colored surface of the magnetic display material to display area of the panel was 550%.

Using the display panel, after the color of the display surface was made green, a white record was displayed and both L values were measured to determine ΔL to be 27.2. Thus, the display was more unclear than that in Comparative example 2.

Also, it was confirmed that the magnetic display material was inserted in the portion at which the film adhered to the back surface and the honeycomb core were adhered, and the adhesion was in an insufficient state.

Comparative Example 4

A display panel was prepared in a similar manner to Example 4 with the exception that the mixing ratio of the magnetic display material in the liquid dispersion was changed to 4 parts by weight of the magnetic display material per 100 parts by weight of the dispersion. At that time, specific gravity of the liquid dispersion was 0.86 and the sum of the display area of one color of the magnetic display material was 4.18 mm$^2$. Accordingly, a ratio of the area of one color of the magnetic display material to display area of the panel was 53%.

Using the display panel, after the color of the display surface was made green, a white record was displayed and both L values were measured to determine ΔL to be 3.5. Thus, the display was more unclear than that in Comparative example 2.

Comparative Example 5

To isoparaffin having a viscosity at 25° C. of 0.8 mPa·s (manufactured by Esso Chemical Co., Ltd.: commercial name ISOPAR-E) was added a thickener in a ratio of 30 parts by weight per 70 parts by weight of the former. After the above was heated and dissolved, a dispersion was obtained upon cooling. Then, the dispersion was diluted so that the ratio of isoparaffin to the thickner became 426.3:6.9. The aforementioned antistatic agent was added thereto so as to become 0.15% of the total, so that a dispersion having a yield value of 0.18 N/m$^2$ and a viscosity at 25° C. of 3 mPa·s was obtained.

A display panel was prepared similarly to Example 2 with the exception that the dispersion was used.

At that time, specific gravity of the liquid dispersion was 0.75 and the sum of the display area of one color of the magnetic display material was calculated to be 4.917 mm$^2$. Accordingly, the ratio relative to display area of the panel was 63%.

The display panel was placed on a white board as in Example 2 and the N-pole of a magnet was contacted to the surface of the panel to pull the magnetic display material to the display surface side and arrange the material so that the white surface sides face the front surface of the panel side of the panel. Thereafter, the S-pole of the magnet was contacted to the display surface of the panel for writing, but a green display sufficient to recognize with the eye could not be attained. In addition, ΔL value was 6.0 determined with a color-difference meter according to the same method as described in Example 2.

Table 5 shows evaluation results on the magnetic material-inverting display panels in aforementioned Examples and Comparative examples.

TABLE 5

|  | Examples | | | | | | | Comparative Examples | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| Yield value (N/m$^2$) | 1.8 | 0.9 | 7.5 | 7.5 | 0.9 | 1.8 | 1.9 | 0.9 | 0.9 | 7.5 | 7.5 | 0.2 |
| Viscosity (mPa·s) | 16 | 8 | 326 | 326 | 8 | 16 | 10 | 8 | 8 | 326 | 326 | 2 |
| Area ratio (%) | 236 | 63 | 457 | 66 | 435 | 75 | 180 | 50 | 524 | 550 | 53 | 58 |
| Amount of antistatic agent (%) | 0.15 | 0 | 0.15 | 0.15 | 0.15 | 0.15 | 0.15 | 0.15 | 0.15 | 0.15 | 0.15 | 0 |
| Ability of inversion | able | able | able | able | Able | able | able | able | unable | Unable | able | able |
| Color difference meter (ΔL) | 31.6 | 11.8 | 31.0 | 13.8 | 31.3 | 16.8 | 22.1 | 8.0 | 30.7 | 27.2 | 3.5 | 6.0 |
| Overall evaluation | ⊙ | ○ | ○ | ○ | ○ | ⊙ | ○ | xx | x | x | xx | xx |

(Note) Regarding "unable" in ability of inversion:
(1) As the area ratio becomes larger, mutual interferences in the inversion of the magnetic particles tend to occur after they are charged. As the area ratio becomes smaller, amount of the magnetic particles becomes also small. Therefore, clearness at observation by the eye becomes inferior in both cases.
(2) A larger area ratio tends to cause an adverse effect on adhesion on the back surface at the charging. That is, there occur problems such as insufficient adhesion owing to insertion of the magnetic particles.
(3) In the overall evaluation, the marks show that ⊙ is very good, ○ is good, x is bad and unpractical, and xx is very bad.

The magnetic material-inverting display panel of the present invention exhibits excellent effects that a display and the erasure are rapid and clear, and maintenance of the display is also good.

The disclosure of Japanese Patent Application No. 2000-54750 filed Jan. 26, 2000, including their specification and claims are herein incorporated by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A magnetic material-inverting display panel comprising a liquid dispersion having a predetermined yield value supported by a supporting member, wherein said liquid dispersion further comprises a magnetic display material having a magnetic S-pole-surface and an N-pole-surface, a dispersion medium and a thickener as main components, a total area of S-pole-surface or N-pole-surface of the magnetic display material being from 60 to 500% of a display surface area of the display panel.

2. The magnetic material-inverting display panel according to claim 1, wherein said total area of the S-pole-surface or N-pole-surface of the magnetic display material is from 75 to 250% of the display surface area of the display panel.

3. The magnetic material-inverting display panel according to claim 1, wherein the thickener is one or more selected from a group of fatty acid bisamides consisting of a hydroxide group, hydrogenated castor oil, and alkylamides of N-acylamino acids.

4. The magnetic material-inverting display panel according to claim 1, wherein the magnetic display material is in a particle form.

5. The magnetic material-inverting display panel according to claim 4, wherein the magnetic display material is a cut or pulverized layer having dispersed magnetic particles into a synthetic resin and/or synthetic rubber composition having a first color, the layer having one surface which is coated with a tinged composition having a second color.

6. The magnetic material-inverting display panel according to claim 4, wherein the magnetic display material is a cut or pulverized layer having dispersed magnetic particles into a synthetic resin and/or synthetic rubber composition having a first color, the layer having one surface which is laminated with a tinged sheet having a second color.

7. The magnetic material-inverting display panel according to claim 1, wherein the liquid dispersion has a yield value of 0.15 to 7.5 N/m$^2$ and a viscosity of 3 to 350 mPa·s.

8. The magnetic material-inverting display panel according to claim 1, wherein the liquid dispersion has a yield value of 0.92 to 7.5 N/m$^2$ and a viscosity of 8 to 350 mPa·s.

9. The magnetic material-inverting display panel according to claim 1, wherein said supporting member comprises two substrates and said liquid dispersion is sealed between the two substrates.

10. The magnetic material-inverting display panel according to claim 1, wherein the liquid dispersion in which said supporting member further comprises a honeycomb cell and said liquid dispersion is sealed into said honeycomb cell.

11. The magnetic material-inverting display panel according to claim 1, wherein the liquid dispersion in which said supporting member further comprises a capsule and said liquid dispersion is sealed into said capsule.

12. The magnetic material-inverting display panel according to claim 1, wherein the liquid dispersion comprises an antistatic agent.

* * * * *